(12) United States Patent
Peleska et al.

(10) Patent No.: US 6,642,733 B1
(45) Date of Patent: Nov. 4, 2003

(54) APPARATUS FOR INDENTIFYING DEFECTS IN ELECTRONIC ASSEMBLIES

(75) Inventors: Pavel Peleska, Graefelfing (DE); Dirk Schnabel, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/762,394

(22) PCT Filed: Jul. 5, 1999

(86) PCT No.: PCT/DE99/02074
§ 371 (c)(1),
(2), (4) Date: May 14, 2001

(87) PCT Pub. No.: WO00/08797
PCT Pub. Date: Feb. 17, 2000

(30) Foreign Application Priority Data

Aug. 6, 1998 (DE) .................................. 198 35 654

(51) Int. Cl.[7] .................... G01R 31/02; G01R 31/08; H01H 31/02
(52) U.S. Cl. .................. 324/763; 324/537; 324/512
(58) Field of Search ................ 324/763, 537, 324/512; 714/732, 736

(56) References Cited

U.S. PATENT DOCUMENTS

| | | | |
|---|---|---|---|
| 4,176,258 A | | 11/1979 | Jackson |
| 5,477,545 A | * | 12/1995 | Huang ................ 324/158.1 |
| 5,627,839 A | | 5/1997 | Whetsel |
| 5,630,056 A | * | 5/1997 | Horvath et al. ........ 395/185.09 |
| 5,784,383 A | | 7/1998 | Meaney |
| 5,838,899 A | * | 11/1998 | Leavitt et al. ......... 395/185.09 |
| 6,161,202 A | * | 12/2000 | Kuntzsch et al. ............. 714/51 |
| 6,297,641 B1 | * | 10/2001 | Mattes et al. ................ 324/523 |
| 6,397,361 B1 | * | 5/2002 | Saitoh ........................ 324/765 |

FOREIGN PATENT DOCUMENTS

| | | |
|---|---|---|
| DE | 42 33 569 C2 | 4/1993 |
| DE | 197 17 686 A1 | 10/1998 |
| EP | 0 704 799 A2 | 4/1996 |

OTHER PUBLICATIONS

Prozebrechentechnik, Georg Farber, Springer–Verlag, Berlin Heidelberg New York 1979.

* cited by examiner

Primary Examiner—Kamand Cuneo
Assistant Examiner—Jermele Hollington
(74) Attorney, Agent, or Firm—Bell Boyd & Lloyd LLC

(57) ABSTRACT

An electronic apparatus having a first assembly and a second assembly, which is identical to the first assembly; a bidirectional line, which connects the first and second assemblies to one another and is coupled to a voltage source; a first and a second test data providing device respectively assigned to an assembly; a first and a second line level fixing device, which are respectively assigned to an assembly, connected to the line via an interface and designed in such a way that, in response to a signal generated by the test data providing device, the line is connected to ground or isolated therefrom; a first and a second line level detecting device, which are respectively assigned to an assembly and connected to the line via the interface; and a first and a second evaluation device, which are respectively assigned to an assembly and designed in such a way that lack of correspondence between the signals of the first and second test data providing devices is detected.

7 Claims, 1 Drawing Sheet

FIG 1
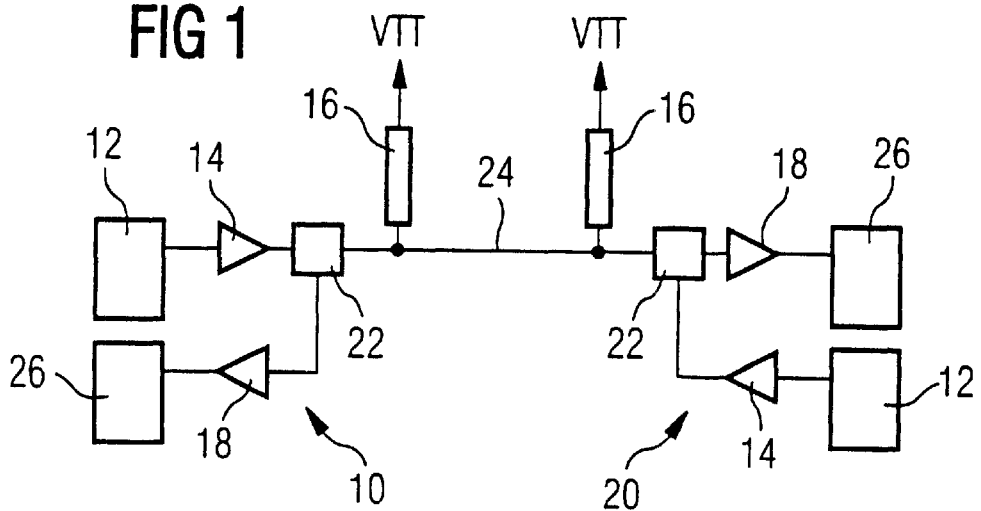
FIG 2
| Y10 | Y20 | Y |
|---|---|---|
| 0 | 0 | 0 |
| 0 | 1 | 0 |
| 1 | 0 | 0 |
| 1 | 1 | 1 |
FIG 3
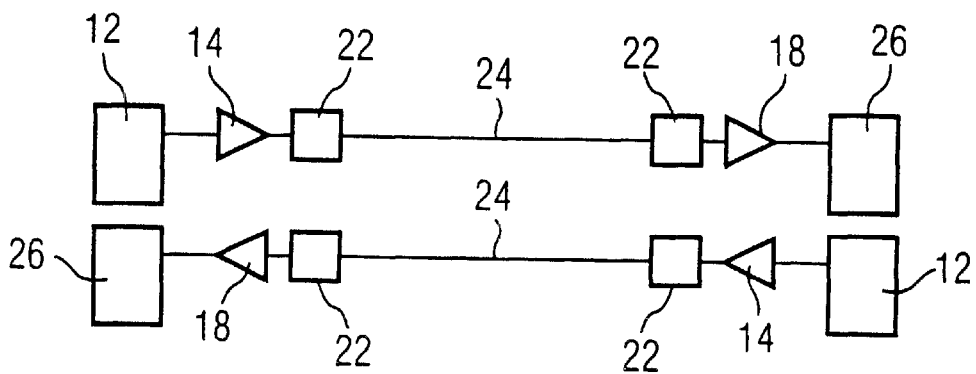

APPARATUS FOR INDENTIFYING DEFECTS IN ELECTRONIC ASSEMBLIES

BACKGROUND OF THE INVENTION

1. Field of the Invention

The present invention relates, generally, to an apparatus for identifying defects in identical electronic assemblies situated therein, and more particularly, to such an apparatus for identifying defects in control computers and switching installations.

2. Description of the Prior Art

The document U.S. Pat. No. 4,176,258 A discloses an electronic apparatus for identifying defects in identical assemblies situated therein, in which the assemblies or their associated defect identification circuits are connected to one another via a unidirectional line. In this case, the transmission direction is fixed via predetermined inputs. As a result, all but one defect identification circuit of the identical assemblies are activated and defect identification is effected in a relatively simple manner.

The document DE 42 33 569 C2 discloses an information processing unit having a plurality of processor modules which each have a defect monitoring circuit. In this case, the processor modules are constructed identically, wherein addresses and data are compared in the event of memory accesses on the processor buses for the purpose of identifying defects in the processor modules. The outlay on circuitry for effecting such defects identification is, however, extremely.

Furthermore, the document DE 197 17 686 A1, discloses a circuit arrangement for a motor vehicle control system constructed from two identically constructed circuits each having a microprocessor system. The input data is processed in a redundant manner in this case. In order to evaluate and monitor both the input data and the intermediate results obtained in the course of data processing, the microprocessor systems are connected to one another via a communications device.

The document U.S. Pat. No. 5,627,839 furthermore discloses so-called "boundary scan cells". For bidirectional signals, mutually isolated scan cells are used in this case, wherein it is possible to test electrical connections between integrated circuits and external circuits and, thus to identify defects (short circuits, interruptions, . . . ).

Moreover, the literature reference "Färber, G.: Prozeβrechentechnik, [Process computing technology], Berlin et al.: Springer-Verlag, 1979, pages 73–77 and 140–142" discloses a circuit for improving reliability in process computer systems. In this case, in a dual-computer system, the two subsystems record measured values and output control signals which are subsequently compared.

In order to identify defects in electronic assemblies, it is known that, in particular in control computers and switching installations, central functions, for reasons of redundancy, are usually carried out by two identical electronic assemblies whose functional capability is monitored. The two assemblies, designed as ASICs for example, carry out the same functions identically at each point in time. In order to monitor the functional capability of the assemblies, one respective assembly sends to the other assembly a signature which includes a plurality of bits and which is assigned to it; i.e., a test data structure which represents the activity of the respective assembly and is formed, for example, from memory addresses, data and control signals. If both assemblies exhibit full functional capability, the signatures assigned to them are identical. After the respective signature has been sent from one assembly to the other, a comparison is made; i.e., the signature assigned to one assembly is compared with the signature sent by the other assembly. If there is a deviation between the signatures, a diagnosis is started and the defective assembly is switched off.

In this case, the respective signatures are sent from one assembly to the other via two parallel bundles of lines. FIG. 3 shows such an arrangement for a line pair. However, this arrangement also requires a high outlay due to the provision of double the number of interfaces; e.g., assembly connector and ASIC pins.

The present invention, therefore, is directed to providing an apparatus for identifying defects in electronic assemblies with a low outlay on circuitry.

SUMMARY OF THE INVENTION

Accordingly, the present invention teaches an electronic apparatus having a first assembly and a second assembly, which is identical to the first assembly; a bidirectional line, which connects the first and second assemblies to one another and is coupled to a voltage source; a first and a second test data output register respectively assigned to an assembly; a first and a second line driver, which are respectively assigned to an assembly, connected to the line via an interface and designed in such a way that, in response to a signal generated by the test data output register, the line is connected to ground or isolated therefrom; a first and a second line receiver, which are respectively assigned to an assembly and connected to the line via the interface; and a first and a second evaluation device, which are respectively assigned to an assembly and designed in such a way that lack of correspondence between the signals of the first and second test data output registers is detected. The outlay on circuitry is reduced in so far as there is only one bundle of lines between the assemblies and, as a result, the number of interfaces and/or connections of the respective assembly is reduced.

The line driver has a pull-up resistor which connects the voltage source to the line. Such an arrangement means that, on the one hand, a level 1 is applied to the line in a simple manner and, on the other hand, reflections on the line are avoided.

Furthermore, the line driver has a buffer, in particular a buffer with open collector, whose output only becomes active when the state of the line is to be changed from the level 1 to the level 0.

The outlay on circuitry can be reduced further by the line receiver also having a buffer or being formed therefrom, which is matched to the buffer of the power driver. This measure reduces the number of component types in the apparatus of the present invention.

The outlay on circuitry is reduced further by the line driver and the line receiver having a bidirectional buffer of integrated design. This measure facilitates the miniaturization of the apparatus according to the present invention.

Preferably, the assemblies including the test data output register, the line driver, the line receiver and the evaluation device are designed as ASICs. The apparatus of the present invention can, thus, be matched to customer-specific requirements in a relatively simple manner.

In particular, the electronic apparatus of the present invention is suitable for use in a processor for switching systems since in these systems, in order to ensure defect-free operation, the central functions are, in each case, carried out by two identical assemblies.

DESCRIPTION OF THE DRAWINGS

FIG. 1 shows a preferred embodiment of the apparatus of the present invention.

FIG. 2 shows the level or the logic state of the line of the preferred embodiment illustrated in FIG. 1 on the basis of the activity of the line drivers assigned to the assemblies.

FIG. 3 shows an apparatus for identifying defects in electronic assemblies known in the prior art with two lines.

DETAILED DESCRIPTION OF THE PREFERRED EMBODIMENTS

FIG. 1 illustrates a preferred embodiment of the electronic apparatus of a the present invention which is used, for example, in a processor for switching systems. A first assembly 10 and a second assembly 20, which are designed as ASICs (Application Specific Integrated Circuit) in this embodiment, are connected to one another via a bidirectional line 24. The assemblies are designed identically and contain a scan register 12, a first buffer 14 (designed in particular as a buffer with open collector), an interface 22, a second buffer 18 (matched to the first buffer 14), and a receiving register 26. The first buffer 14 is connected between the output of the scan register 12 and the interface 22, while the second buffer is connected between the interface 22 and the input of the receiving register 26. The line is connected to a voltage source via a pull-up resistor 16 at each end, the voltage source generating an essentially constant DC voltage of between 1.2 and 1.5 V.

Depending on the bit width (n=9, 18 or more bits) of the signature which is to be set in parallel per clock cycle, the line 24 includes a bundle of n lines which are each connected at their ends to a pull-up resistor 16 and an interface 22, designed here as an ASIC pin. Furthermore, the two assemblies each contain, in accordance with the bit width, an interface 22 having n connections (ASIC pins) and n first and n second buffers 14 and 18, respectively. For reasons of clarity, FIG. 1 merely illustrates an arrangement which is suitable for transmitting a signature having a bit width of one bit (n=1).

The method of operation of the preferred embodiment of the present invention is described below. In accordance with its activity, each assembly generates a signature having a width of n bits. The signature, which differs from zero in normal operation via a parity bit, is buffer-stored in the scan register 12. The line is fixed at the level (the logic state) 1 in a preset manner through the connection to the voltage source via the pull-up resistor 16. The buffer 14, which represents a driver for sending the signature, only becomes active when a level 0 is sent or driven as a signature bit. In this case, the line 24 is connected to ground, so that the line is fixed at the level 0. The buffers 14 of both assemblies can become active simultaneously without a disturbance or a conflict arising.

FIG. 2 illustrates the state of the line 24 on the basis of the activity or nonactivity of the buffers 14 of the first and second assemblies 10 and 20, respectively. Y10 and Y20 represent signature bits of the first and second assmblies, respectively, or the state of the corresponding buffer 14. Y represents the logic state of the line. Accordingly, the line 24 has a level 1 only when both assemblies are simultaneously inactive; i.e., or a level 1 is sent as a signature bit. Otherwise, the line 24 has a level 0. At the same time, i.e. during the same clock cycle, the buffer 18, which represents a receiver of the signature sent by the other assembly, of each assembly receives or detects the instantaneous state of the line. The buffer 18 also becomes active only at a level 0. The state of the line is detected during the same clock cycle as the bit of the signature is sent. After detection by the buffer 18, the state of the line is buffer-stored in the receiving register 26. The clock cycle is chosen in such a way that set-up and hold times are adhered to.

An evaluation device (not illustrated) is connected both to the scan register 12 and to the receiving register 26 of the same assembly and compares the content thereof with regard to the same clock cycle. The evaluation of the contents of the two registers by the evaluation device is performed in a manner which takes into account the following relationship.

In the defect-free state, both assemblies generate the same signature, drive it simultaneously onto the common line(s) and read in the value thereof in the same clock cycle. If different signatures are driven on account of a defect of an assembly, at least one assembly on at least one line will read in a value which does not correspond to the value which it applied and, thus, identifies a defect.

During the comparison of the signatures, what is important is that the signature output by one assembly should be identical to the read-in signature from the other assembly. Two cases should be taken into consideration here:

1. One assembly drives a level 1 and reads in a level 0. In this case, the difference from the one assembly is identified immediately.
2. One assembly describes a level 0 and reads in a level 0 even though the other assembly drives a level 1. Here the defect is identified immediately by the other assembly, which thereupon drives a level 0 on all the connections of the interface. Since, as described above, the signature of an assembly can never be zero in normal operation, the one assembly identifies the defect in the next clock cycle.

Although the present invention has been described with reference to specific embodiments, those of skill in the art will recognize that changes may be made thereto without departing from the spirit and scope of the invention as set forth in the hereafter appended claims.

What is claimed is:

1. An electronic apparatus for identifying defects in identical electronic assemblies situated therein, the electronic apparatus comprising:

a first assembly;

a second assembly which is identical to the first assembly;

a bidirectional line which connects the first assembly to the second assembly and which is coupled to a voltage source;

a first scan register operating as a first test data output register as part of the first assembly;

a second scan register operating as a second test data output register as part of the second assembly;

a first line driver as part of the first assembly, the first line driver being connected to the bidirectional line via a first interface, the first line driver designed such that, in response to a first signal generated by the first test data output register, the bidirectional line is one of connected to ground and isolated therefrom;

a second line driver as part of the second assembly, the second line driver connected to the bidirectional line via a second interface, the second line driver being designed such that, in response to a second signal generated by the second test data output register, the bidirectional line is one of connected to ground and isolated therefrom;

a first line receiver as part of the first assembly, the first line receiver being connected to the bidirectional line via the first interface;

a second line receiver as part of the second assembly, the second line receiver being connected to the bidirectional line via the second interface;

a first evaluation device as part of the first assembly; and a second evaluation device as part of the second assembly, wherein the first and second evaluation devices are designed such that a lack of correspondence between the first and second signals of the first and second test data output registers is detected.

2. An electronic apparatus for identifying defects in identical electronic assemblies situated therein as claimed in claim 1, wherein the first and second line drivers each respectively include a pull-up resistor which connects the voltage source to the bidirectional line.

3. An electronic apparatus for identifying defects in identical electronic assemblies situated therein as claimed in claim 1, wherein the first and second line drivers each respectively include a buffer.

4. An electronic apparatus for identifying defects in identical electronic assemblies situated therein as claimed in claim 1, wherein the first and second line receivers each respectively include a buffer.

5. An electronic apparatus for identifying defects in identical electronic assemblies situated therein as claimed in claim 1, wherein the first and second line drivers and the first and second line receivers each respectively include a bidirectional buffer of integrated design.

6. An electronic apparatus for identifying defects in identical electronic assemblies situated therein as claimed in claim 1, wherein the first and second assemblies are each respectively designed as Application Specific Integrated Circuits (ASICs).

7. An electronic apparatus for identifying defects in identical electronic assemblies situated therein as claimed in claim 1, wherein the electronic apparatus is used in a processor for switching systems.

* * * * *